Dec. 10, 1963 H. RUSKIN 3,114,030
RESISTANCE WELDING
Filed July 10, 1961 2 Sheets-Sheet 1

INVENTOR.
HENRY RUSKIN
BY
Paul S. Martin
ATTORNEY

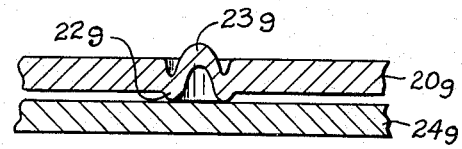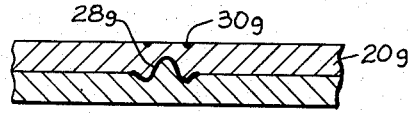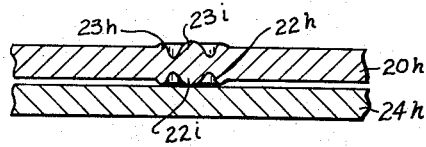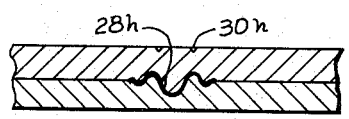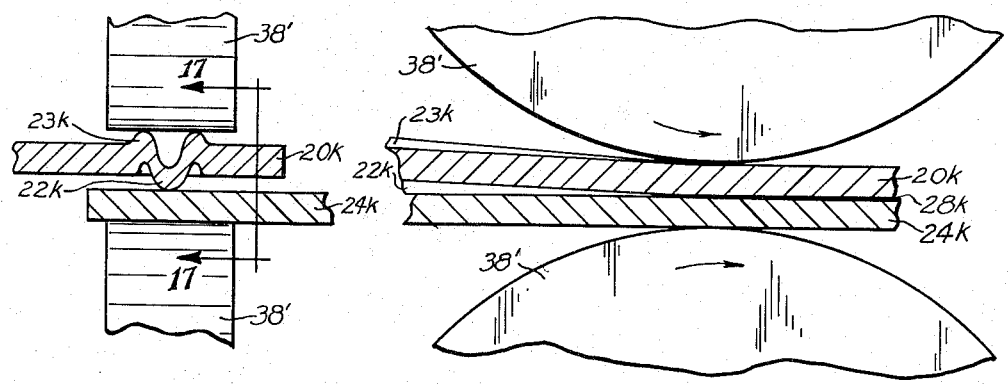
INVENTOR.
HENRY RUSKIN

United States Patent Office  3,114,030
Patented Dec. 10, 1963

3,114,030
RESISTANCE WELDING
Henry Ruskin, Bayside, N.Y., assignor to Ruskin Development & Manufacturing Corp., Flushing, N.Y.
Filed July 10, 1961, Ser. No. 122,785
21 Claims. (Cl. 219—93)

The present invention relates to electrical welding.

An object of this invention resides in the provision of a novel resistance welding method wherein the resulting welds may readily be inspected without resort to destructive tests. A related object resides in the provision of a novel resistance welding method, such that the welded product is of high reliability and of excellent appearance. A further object resides in the provision of novel formations in sheet metal having proportions and configurations specially adapted for improved resistance welding.

Resistance welding is a common method of joining two or more pieces of sheet metal, in which the metal pieces are pressed together between welding electrodes while current is passed through them in a localized area. Ordinary resistance welding of sheet metal is unreliable, to a degree, partly due to the difficulty of controlling the area through which the welding current flows. This causes variations in the welding temperature and in the strength of the weld. Moreover, if there should be any oxide, oil or other contamination on the sheet metal being welded, the welding operation would take place without producing a sound weld. Such foreign material would interfere with the weld if it should occur either at one of the surfaces engaged by the welding electrodes or between the surfaces to be welded together.

For joining a piece of sheet metal to another metal part, projection welding is often used. This method involves forming a localized projection on one face of the metal sheet by depressing a corresponding spot at the opposite face of the sheet metal. When welding pressure and energy are applied to the sheet having the projection in contact with the companion sheet, a weld is made in the controlled area of the projection. Projection welding is considered superior to ordinary resistance welding in that it gives better control over the engaged surface areas through which the welding current flows.

As in ordinary resistance welding, projection welding is also subject to the possibility of defective welds occurring. Defective projection welds may be caused by foreign materials on one of the sheet-metal surfaces in the welding current path, or by improper control of the welding energy or pressure. The quality of a projection weld may be checked by destructive testing techniques. A sampling of a production run of the welded products may be taken, one out of each 50 welded pieces for example, and the sheets of each welded sample are pulled apart. This test shows sound welds where a "button" is pulled. Where no button or a shallow button is formed, or where the area of the projection tears out of its sheet in the pull test, it is evident that the particular tested piece had a defective weld. Whether the weld happened to be good or bad, the welded product is destroyed in the test. The remainder of the production run of welded products from which the sample was taken may include any number of undetected defective welds.

An important feature of the present invention resides in the nature of the finished weld. The welded sheets may be visually examined, or inspected by touch, or they may be mechanically gaged in searching for defective welds. If such welds should occur, any improper welding conditions can be quickly noted and corrected to restore the welding operation to optimum effectiveness. Moreover, if defective welds should occur sporadically, the defective units may be identified readily and culled without resort to destructive testing or to elaborate, costly and sophisticated testing apparatus.

As will be seen in the detailed description of various embodiments of the invention below, a sheet-metal part can be effectively welded to another metal part by first forming opposite or nearly opposite raised formations on the sheet metal in the weld area, each raised formation having an immediately adjacent recessed formation. The raised formations on opposite sides of the sheet may be directly aligned, or they may be offset, and they may take various forms as will later appear. The prepared sheet-metal part is placed on another part that has a flat surface in the weld area, and the parts are subjected to welding current and pressure. Ordinarily the pressure is provided by the same members that serve as electrodes, above and below the weld. However, one electrode may engage the exposed projecting formation, another element may provide mechanical support at the bottom of the companion sheet and the return electrode may engage the top surface of that companion member over an extended surface area, providing a return contact for the welding current path. This arrangement is useful where the bottom surface of the lower sheet is covered by insulation or for some reason should not carry welding current. Regardless of which arrangement of welding electrodes is adopted, the exposed raised formation is virtually flattened. When this has occurred, the opposite raised formation has become part of a good resistance weld. If the voltage used should be inadequate for any reason, or if the current duration is too short, or if foreign materials on the metal or on the electrode surfaces should interfere with the intended current flow, the weld is not what it should be under the established standardized conditions. Under these undesirable and ordinarily unnoticed departures from proper welding conditions, the exposed raised formations remain incompletely or irregularly flattened. The residual part of the raised formation or other irregularity can be seen on inspection; it can usually be felt; and it can be detected by various forms of gages.

The embodiments shown and detailed below involve a top member with a weld formation and a bottom member that is flat. It will be appreciated that this is susceptible of modification, as in joining three members together, using one sheet-metal member between two additional members, each of the outer two members having prepared weld formations as shown and described.

The weld as properly performed is of excellent appearance, the finished weld surface being essentially flush with the adjacent sheet metal that did not enter into the welding process. All the welded parts can be inspected without resort to elaborate testing apparatus and without destruction of any samples.

In the illustrative description below, in which reference is made to the accompanying drawings forming part of this disclosure, a number of species of spot-weld are discussed, of the kind produced by a flat-faced localized welding electrode bearing against the exposed raised formation. Rows of such spot-welds of the forms shown and described may be used. Further, continuous-line oppositely directed raised formations may be used in like manner for making seam welds.

The foregoing and certain additional objects and features of the invention will be more fully appreciated from the detailed description that follows, in which reference is made to the accompanying drawings. In the drawings:

FIGS. 12 and 14 are enlarged cross-sections of pairs of sheet-metal members prepared for welding, as additional modifications of the embodiment in FIG. 1;

FIGS. 13 and 15 are enlarged cross-sections of the properly completed welds of the modifications in FIGS. 12 and 14, respectively;

FIG. 16 is a cross-sectional view of a pair of sheet-metal members preparatory to a seam weld, including a pair of welding rollers, the cross-section being taken transverse of the desired seam-weld; and FIG. 17 is a cross-section of a pair of sheet-metal members and welding rollers during formation of a seam weld, as viewed from the line 17—17 in FIG. 16.

Figures 1, 2:
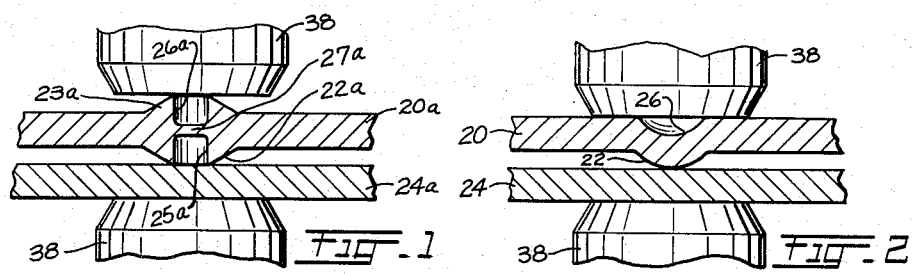
FIG. 1 is an enlarged cross-section of two sheet-metal members in position for welding between welding electrodes, embodying certain aspects of the invention.
FIG. 2 is an enlarged cross-section of two pieces of sheet metal between welding electrodes for projection-welding according to conventional practice.
Figures 3, 4:
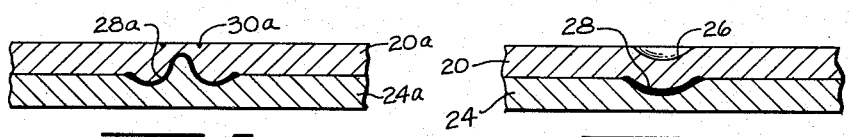
FIGS. 3 and 4 are enlarged cross-sections of completed welds of the sheet-metal parts in FIGS. 1 and 2, respectively, the heavy line representing the weld interface.

Referring now to the drawings, FIG. 2 shows a pair of sheet-metal members prepared for conventional projection-welding. A first sheet-metal member 20 is shown in enlarged cross-section, having a welding projection 22 bearing against another sheet-metal member 24. Opposite projection 22 there is a cavity 26. The projection 22 is usually formed by off-setting a localized area of sheet-metal member 20 from the remainder of the sheet. The two members in FIG. 2 are clean, and they are welded to each other using welding electrodes 38 applied with proper pressure and supplied with proper welding electrical energy. The finished product, in cross-section, appears somewhat as illustrated in FIG. 4 and has a welded interface 28 of fused metal uniting sheets 20 and 24. The cavity 26 invariably remains, in usual projection welds, although it may be reduced in size. Comparing good welds and bad welds, the appearance of the exposed surfaces are usually very much alike.

FIG. 1 illustrates a first sheet-metal member 20a prepared for resistance-welding in a manner that utilizes features of the present invention. A raised formation 22a is shown in contact with sheet-metal member 24a. Another raised formation 23a is shown at the side of sheet 20a opposite that from which formation 22a extends. Raised formations 22a and 23a encircle a pair of depressions 25a and 26a, which are separated by a wall 27a that is much thinner than sheet-metal member 20a. (The term "raised formation" or "projecting formation" is here used in place of "projection" to avoid possible confusion with the conventional projection-welding formations such as the form illustrated in FIG. 2). The raised formations, the depressions and the separating wall of sheet-metal member 20a are all prepared by driving a pair of aligned cylindrical tools toward each other, of about the same diameter as the thickness of metal sheet 20a, with sufficient force to cause cold-flow of the sheet metal out of the space between the ends of the tools. As a result, both raised formations 22a and 23a are annular, and they are alike. The sheet-metal members in FIG. 1 are welded to each other by applying flat-faced welding electrodes 38 (as in FIG. 1) to the exposed top and bottom surfaces of the sheet-metal members, and impressing welding potential. Any welding current that flows through formation 23a will also flow through formation 22a. Under optimum welding conditions of pressure, and electrical current and duration, the finished weld has a flat top surface that involves only vestiges 30a of the initial projecting and recessed formations of the exposed or top surface of sheet 20a. The interface 28a of the weld is somewhat as illustrated in FIG. 3, although the exact configuration of the metal flow between the metal of sheets 20a and 24a has not been ascertained by precise methods. The exposed top surfaces of member 20a is remarkably flat, comparing the area of the weld and the surrounding surface of the metal not exposed to welding conditions. The weld is distinctly superior in this respect to the typical spot-weld, which has definite depression in the weld area.

Figures 5, 6:
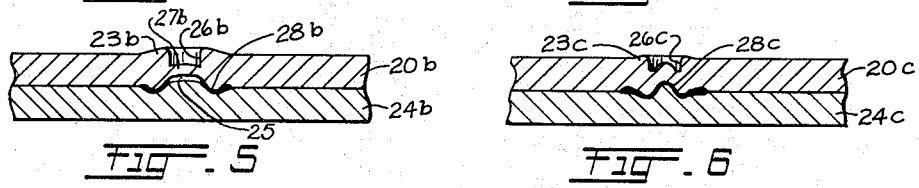
FIGS. 5 and 6 are enlarged cross-sections of welds carried out with the parts prepared as shown in FIG. 1, but with inadequate welding voltage.

FIG. 5 shows a weld that has been made using sheet-metal members with formations as illustrated in FIG. 1, using about one-fifth of the voltage used in making the weld represented in FIG. 3. It will be observed that there is a smaller welding interface 28b than interface 28a of the proper weld in FIG. 3, and there may even be a gap 25 between wall 27b and sheet 24b. That the weld of FIG. 5 is not what it should be is revealed by the exposed residual depression 26b, and residual raised formation 23b.

FIG. 6 shows sheet-metal members 20c and 24c prepared for welding as in FIG. 1, but welded with about one-half the voltage used for the weld represented in FIG. 3. The weld interface 28c is smaller and weaker than that in FIG. 3. The welding deficiency is revealed by the residual depression 26c and the residual annular formation 23c.

FIGS. 5 and 6 demonstrate what may be expected if inadequate voltage should be used, either at random or by faulty adjustment of the welding equipment. In both instances, the surface appearance of the weld may be expected to show a prominent difference from that in FIG. 3, carried out under proper conditions. In setting up the welding operation for production, the welds made under various weld parameters of current, duration and pressure may be correlated with the resulting welds. Optimum conditions are attained when the exposed surface of the formed sheet is flattened but not excessively softened.

Figures 7, 8:
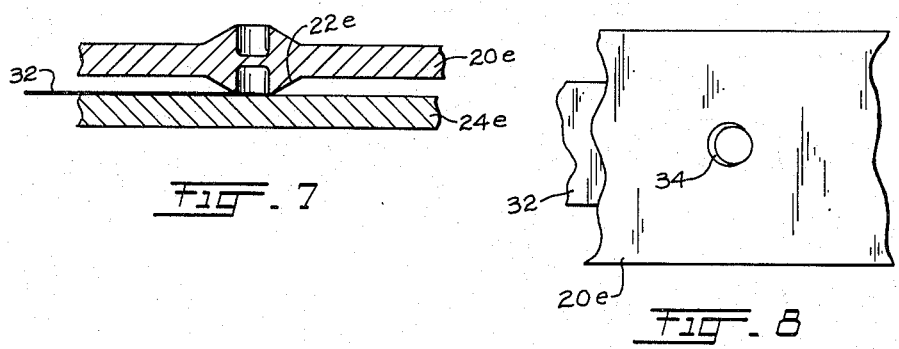
FIG. 7 is an enlarged cross-section of parts prepared for welding as in FIG. 1, with a wafer of foreign material interposed in part of the welding area for demonstrating a further consequence of improper welding conditions.
FIG. 8 is the top plan view of the parts in FIG. 7 after a welding operation.
Figures 9, 10:
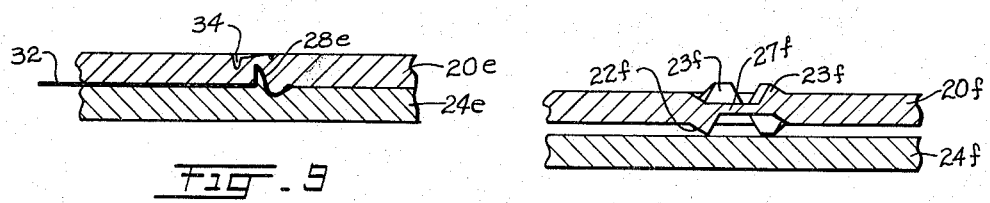
FIG. 9 is an enlarged cross-section of the parts in FIG. 8.
FIG. 10 is an enlarged cross-section of two sheet-metal members to be welded, illustrating a modification of the embodiment in FIG. 1.

In the event that the equipment is properly adjusted but if some foreign matter should be present at the weld area at the start of the weld, such foreign material may very well interfere with the flow of welding current. In FIG. 7, a pair of sheet-metal members 20e and 24e of the identical form shown in FIG. 1 are arranged with half of the lower annular formation 22e obstructed from contact with sheet-metal member 24e by an interposed wafer 32 of heat-resistant insulation such as mica. That this interfering condition existed during the welding operation is revealed in the finished weld shown in plan vew in FIG. 8 and in enlarged cross-section in FIG. 9. A tell-tale crescent 34, in the form of a residual depression, is prominent. This is one form of distinctive irregularity which differs from the fine, regular circle 30a that develops under proper welding conditions. Naturally, the weld interface 28e is irregular and is much weaker than that of FIG. 3.

All of the upper sheet-metal members in FIGS. 1–9 are prepared like sheet-metal member 20a, having completely symmetrical formations above and below a mean horizontal plane, raised formations 22a and 23a being coaxial and symmetrical, and being continuous annuli. Such formations are readily formed, and they require extremely simple, inexpensive and durable tools. However, in other aspects of the invention, the annuli need not be complete and continuous. FIG. 10 shows a sheet-metal member 20*f* having a series of raised formations 23*f* with intervening gaps. Raised formations 22*f*, at the opposite surface of member 20*f*, are similarly separated from each other by gaps. Each projection 23*f* is directly opposite a gap between a pair of formations 22*f*; and likewise, each formation 22*f* is directly opposite a gap between a pair of projections 23*f*. When the members 20*f* and 24*f* are subjected to welding pressure and energization by a pair of welding electrodes, the current will not flow straight through the sheets as is roughly true of the formations as illustrated in FIG. 1 but, instead, the current in each projection 23*f* divides and flows slantwise through the sheet to the two next-adjoining projections 22*f*. This is true of the current that passes through each of the three projections 23*f*, and as a result, the current and the heating effects in each of the projections 23*f* is approximately the same as that in each of the projections 22*f*. The finished weld is essentially flat, with a revealing regular pattern in the case of properly executed welds, and with an irregular pattern and an irregular surface in the case of imperfectly executed welds.

In FIG. 12, another modification is shown in which the welding current path is at a slant angle through the oppositely extending raised formations, which are not directly and symmetrically opposite each other. A central projection 23*g* extends above the top surface of sheet-metal member 20*g*, within an annular depression. A raised annular formation 22*g* extends from the bottom surface of member 20*g*, with a relatively deep depression at its center. The mass of formation 23*g* is equal or, preferably, a bit greater than that of formation 22*g*. They are formed by tools of complementary shapes that are coaxially arranged at opposite faces of the sheet-metal member and driven toward each other to force the metal to flow and assume the configuration shown. The properly finished weld corresponding to the prepared sheets of FIG. 12 appears in FIG. 13.

A still further formation is shown in FIG. 14 involving an annular raised formation 23*h* and a central projecting formation 23*i*. Sheet-metal member 20*h* may have such projecting formations 23*h* and 23*i* at the top, and mirror-image symmetrical projections in the form of an annular raised formation 22*h* and a central raised formation 22*i*. A properly executed weld between members 20*h* and 24*h* is represented in FIG. 15, having a regular fine-line circle 30*h* as a vestige of the depression between projections 23*h* and 23*i*. An ample, reliable welded interface somewhat as that represented by line 28*h* results.

In each of the foregoing examples, as represented in FIGS. 1, 10, 12 and 14, there are local projecting formations extending from opposite surfaces of the sheet-metal member, in a local welding area such that any welding current that passes through the formation at the interface must also be carried by the formation that is exposed and which is engaged by a welding electrode in carrying out the welding process. In each case, the formation is such as to be properly firm in resisting the welding pressure in the absence of proper welding energy. Where the welding current is at the proper level, due to the appropriately adjusted equipment and due to freedom from foreign substances, the finished weld involves only a fine trace in an otherwise flat weld area that is a smooth continuation of the surrounding surface of the sheet metal. Its appearance is excellent and it further provides direct evidence of a highly reliable and strong weld. Should a series of welds on the same or different articles fail to produce the desired flat appearance and regular vestige of the projection pattern, indication is at once had of a need for adjusting the welding equipment. If there are erratic poor welds produced, then the cause may be traced to oil, dirt, oxide scale or other foreign materials in the welding circuit, or to an erratic welding current supply. In any event, each and every welded article may be readily inspected visually or by touch or by a suitable form of gage. Defectively welded units may be quickly culled, and there is no need for wasteful destructive testing or for elaborate and delicate test equipment to check the foregoing types of resistance welds.

Figure 11:
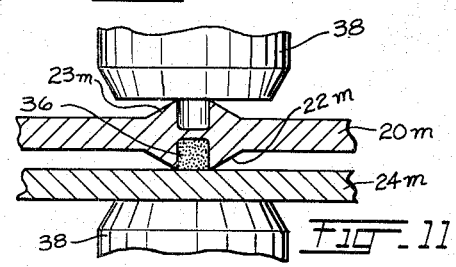
FIG. 11 is an enlarged cross-section of the two sheet-metal members prepared for resistance welding as another modification of FIG. 1, including the end portions of a pair of welding electrodes.

Sheet steel has been successfully welded and demonstrated to be successfully welded by the foregoing method, using the foregoing formations in the prepared sheets. It is of course apparent that the novel concepts are also applicable to other weldable metals. FIG. 11 shows an application of welding flux or brazing alloy or both as an aid in the process under appropriate circumstances. A pair of sheet-metal members 20*m* and 24*m* may be united by a welding operation, using formations like that in FIG. 1 with welding flux or a brazing alloy 36 or both filling the cavity within annular projection 22*m*. Flat-faced welding electrodes 38 apply the necessary welding pressure and electrical energy.

Seam-welding may be effected, using continuous formations 22*k* and 23*k* extending from opposite sides of sheet 20*k* (FIG. 16). Rollers 38' apply pressure as the work and the rollers move relatively to subject the successive points along formations 22*k* and 23*k* to welding conditions. Adjacent each raised formation there is at least one recess, as in the various spot-welding modifications described previously. The lateral separation of the oppositely extending raised formations is limited, in relation to the thickness and the toughness or hardness of the metal involved, so that the welding pressure alone is definitely inadequate to flatten the formations, in the absence of welding current.

As a detail of incidental interest, it may be noted that the thickness of the metal sheets and the height of raised formations 22*k* and 23*k* in FIG. 17 are greatly exaggerated in relation to the curvature of the roller electrodes 38'. In practice, and as shown in FIG. 17, the raised formations 22*k* and 23*k* are progressively displaced into the thickness of the sheets, as the weld interface 28*k* is formed. The curvature of rollers 38' in practice is much less than that illustrated relative to the metal-sheet thickness, the drawing being somewhat diagrammatic in this respect.

While certain formations have been found highly effective and are disclosed above as being presently preferred, it will be apparent that other configurations will be found suitable for carrying out the purposes of the present invention. Further variations and varied applications of the novel aspects of this invention will readily be suggested to those skilled in the art by the foregoing disclosure; and therefore the present invention should be broadly construed in accordance with its full spirit and scope.

What is claimed is:

1. The method of welding two sheets of metal together, including the steps of forming oppositely projecting formations at a particular portion of a first metal sheet, applying welding pressure to an exposed formation of the first metal sheet while the oppositely projecting formation bears against a second metal sheet and, during application of the welding pressure, passing welding current through said second sheet and both said formations in series.

2. The method of welding two sheets of metal together, including the steps of driving tools of limited cross-section into opposed portions of the opposite surfaces of a first sheet of metal and thereby producing raised formations at opposite surfaces of the sheet adjacent a portion of reduced thickness, pressing a welding electrode against an exposed projecting formation while the projecting formation at the opposite side of the sheet bears against another metal sheet, and while applying such pressure, passing welding current through the latter metal sheet and said formations in series.

3. The method in accordance with claim 2 wherein each of said tools is a cylinder having a diameter approximately equal to the thickness of said first metal sheet, and wherein said tools are aligned while being driven into the opposite surfaces of the first sheet thereby to produce a spot of reduced thickness having surrounding raised annular formations at both sides of the first sheet and in direct alignment with each other.

4. The method in accordance with claim 1 wherein the projecting formations are formed to be symmetrical with respect to the median plane between the opposite surfaces of said first metal sheet.

5. The method in accordance with claim 1 wherein the oppositely projecting formations comprise portions that are offset relative to each other to a limited extent to provide at least one welding-current path extending slant-wise through the sheet.

6. The method of making resistance welds between two sheets of metal, including the steps of inducing localized cold-flow of metal at one surface of a first sheet of metal so as to form a recess therein and, immediately adjacent thereto, to produce a formation that is raised in relation to that part of said one surface that is unaffected by said localized cold-flow, applying the raised formation of said one sheet to another metal sheet and subjecting the metal sheets to welding current and pressure in the area of said formations.

7. The method of welding two sheets of metal together, including the steps of forming depressions in and immediately adjacent raised formations on both sides of a first metal sheet at a common small area, placing a second metal sheet against one side of said first metal sheet, and applying welding pressure and energy to said sheets at said area.

8. The method of welding two sheets of metal together, including the steps of forming depressions in and immediately adjacent raised formations on both sides of a first metal sheet at a common small area, depositing a weld-promoting material in the depression at one side of said first sheet, placing a second metal sheet against said one side of said first metal sheet, and applying welding pressure and energy to said sheets at said area.

9. The method of welding two sheets of metal together, including the steps of forming depressions in and immediately adjacent raised formations on both sides of a first metal sheet at a common small area, depositing welding flux in the depression at one side of said first sheet, placing a second metal sheet against said one side of said first metal sheet, and applying welding pressure and energy to said sheets at said area.

10. The method of welding two sheets of metal together, including the steps of forming depressions in and immediately adjacent raised formations on both sides of a first metal sheet at a common small area, depositing brazing alloy in the depression at one side of said first sheet, placing a second metal sheet against said one side of said first metal sheet, and applying welding pressure and energy to said sheets at said area.

11. The method of producing a sound projection weld including the steps of forming at least approximately aligned raised formations and recesses closely adjacent to respective raised formations on both of the opposite surfaces at a localized area of a metal sheet, applying welding pressure to one of said formations while the opposite formation is supported by a second metal sheet, passing welding current from said second sheet through said formations in series, and maintaining said welding pressure and current for a time interval, the values of said pressure, current and time interval being related to cause flattening of the exposed projecting formation.

12. A sheet-metal member having opposite recesses at a localized region of reduced thickness and oppositely extending resistance-welding raised formations immediately adjacent such recesses, said raised formations being of at least nearly equal mass.

13. A sheet-metal member having both resistance-welding raised formations and recesses adjacent thereto at both sides of a common small area, the masses of said raised formations being at least nearly equal to each other and proportioned for resistance welding.

14. A metal member having oppositely extending raised resistance-welding formations of approximately equal mass projecting from opposite sides thereof and each side having a recess immediately adjoining a respective one of said raised formations, the volume of said projections being at least approximately equal to that of the adjoining recesses.

15. A metal member having two opposite surfaces, a pair of raised formations projecting from said surfaces and proportioned for resistance welding and being effectively aligned with each other, one of said formations being adapted to be engaged by a welding electrode and the other being adapted to engage and form a weld to another metal member, a recess immediately adjoining each one of said raised formations and each of said recesses having a volume substantially equal to that of the adjoining one of said projections and therefore being adapted to be filled by a mass of metal equal to its adjoining projection when the latter is subjected to welding energy and pressure.

16. The method of welding two sheets of metal together, including the steps of forming and assembling first and second metal sheets with an exposed projecting formation on said first sheet, and with another formation at least nearly aligned with said exposed formation and extending from one of said metal sheets into contact with a flat area of the other of said metal sheets, and subjecting said sheets to welding current and pressure in the region of said formations.

17. The method of welding two sheets of metal together, including the steps of forming a first metal sheet with a projecting formation and an immediately adjoining recess whose volume below the adjacent surface of the metal sheet equals that of the projecting formation above said surface, assembling said first metal sheet against another metal sheet with said projecting formation exposed and with another preformed formation like said projecting formation at least nearly aligned therewith and extending from one of said metal sheets toward and against the other of said metal sheets, and subjecting said sheets to welding current and pressure in the region occupied by said formations.

18. The method of welding two metal members together, including the steps of forming raised oppositely extending formations at opposite sides of a first metal member, assembling a second metal member to one of said formations, applying a welding electrode to the other of said formations and, with welding means including said electrode, subjecting said metal members to welding current and pressure for a welding time interval related to the welding current and pressure so that substantial flattening of said other formation results.

19. The method of welding two metal members together, including the steps of forming raised oppositely extending formations at opposite sides of a first metal member and forming recesses immediately adjoining said raised formations, the volume of the recesses being at least approximately equal to the volume of the adjacent formations, respectively, in relation to the adjacent metal surfaces, assembling a second metal member to one of said formations, applying a flat-faced welding electrode to the other of said formations and, with welding means including said electrode, subjecting said metal members to welding current and pressure for a welding time interval related to the current and pressure to produce substantial flattening of said other formation and filling of its adjacent recess.

20. The method of welding two metal members together, including the steps of forming and assembling first and second metal members with a first raised formation on one of said members exposed and with another raised formation on one of said metal members at least nearly aligned with said first formation and engaging the second of said metal members, and subjecting said members to welding current and pressure in the region of said formations so that the welding current traverses said formations in series, the time of the welding step being related to the welding current and pressure to cause substantial flattening of said exposed formation.

21. The method of welding two metal members together, including the steps of assembling first and second metal members with a first raised formation on one of said members exposed and with another raised formation on one of said metal members at least nearly aligned with said first formation and engaging the other of said metal members, said formations having immediately adjacent prepared recesses in the same surfaces bearing such formations and the volume of the recesses being at least approximately equal to the volume of the adjacent formations, respectively, in relation to the adjacent metal surfaces, and subjecting said members to welding current and pressure in the region of said formations so that the welding current traverses said formations in series, the time of the current flow being related to the value of the current and the pressure to cause flow of the mass of said exposed formation into the adjacent recess and substantial flattening of the exposed side of said one member in the area of said first formation.

References Cited in the file of this patent
UNITED STATES PATENTS

| | | |
|---|---|---|
| 690,958 | Hunter | Jan. 14, 1902 |
| 1,714,144 | Smith | May 21, 1929 |
| 2,045,420 | Strickland | June 23, 1936 |
| 2,087,530 | Potchen | July 20, 1937 |
| 2,823,297 | Aversten | Feb. 11, 1958 |
| 3,010,011 | Darlington | Nov. 21, 1961 |